UNITED STATES PATENT OFFICE.

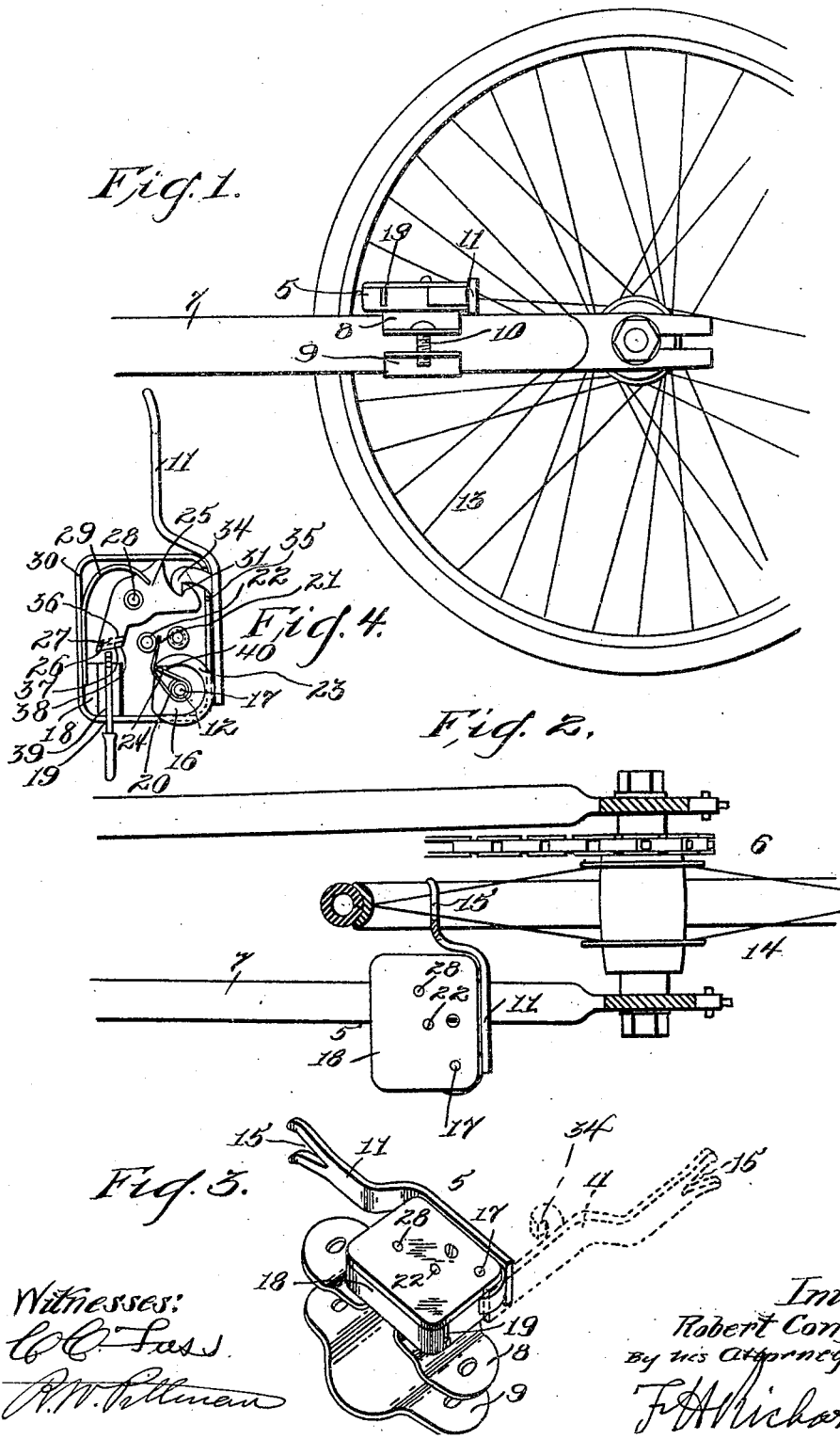

ROBERT CONGREVE, OF CHRISTCHURCH, NEW ZEALAND.

LOCK FOR VEHICLES.

No. 823,107.　　　Specification of Letters Patent.　　　Patented June 12, 1906.

Application filed November 5, 1904. Serial No. 231,472.

*To all whom it may concern:*

Be it known that I, ROBERT CONGREVE, a subject of the King of Great Britain, residing in 127 Colombo street, Christchurch, in the Provincial District of Canterbury, Colony of New Zealand, have invented certain new and useful Improvements in Locks for Vehicles, of which the following is a specification.

This invention has reference to a class of locks or locking devices which are adapted to be used in connection with vehicles and bicycles.

It is an object of the invention to provide a locking member adapted to be attached to a running-gear, framing, or wheels of vehicles or bicycles, and also to cause said locking member to carry a device adapted to prevent at will a movement of the wheels with relation to the frame or running-gear.

It is a further object to produce an inexpensive, durable, and efficient structure.

In attaining the objects comprehended by this invention such invention may be embodied in any suitable form or arrangement of parts, a convenient embodiment being illustrated on the accompanying sheet of drawings, whereon—

Figure 1 illustrates an elevational view of a fragment of a running-gear—for instance, of an automobile—with such form of lock as I have illustrated thereto attached. Fig. 2 is a fragmentary elevational view of an embodiment of the lock applied to the frame of a bicycle. Fig. 3 illustrates, perspectively, such form of lock and a clamping member for the same, and Fig. 4 is a detail plan view of the interior of said lock in the form shown.

Similar characters of reference indicate corresponding parts throughout the figures.

It is immaterial whether or not the lock is applied to the frame or running-gear of a bicycle or vehicle, and whether or not the locking-arm should engage the spoke of the wheel or should project between two spokes, or whether the locking member be so attached to the wheel that its locking-arm would come into contact with a portion of the framing or running-gear. Any of such arrangements would clearly come within the comprehension of this invention. It might, however, in practice be deemed more expedient to secure the locking device onto the framing, permitting the arm pivoted to said locking device to come into contact with or engage the spokes of the wheel.

In the form shown the locking device, which may be generally designated as 5, may be suitably attached to the running-gear 6 or the framing 7 in any suitable manner—such, for instance, as by clamps 8 and 9, respectively, which may be joined together by screw-threaded members 10. This locking device 5 carries a locking-arm 11, which in the present instance is pivoted, as at 12, preferably to one corner of the lock, and it is the office of this arm to either engage with the spokes 13 or between the spokes of the wheel 14 if the locking member is secured to the frame or to butt against a portion of the frame if the locking device should be secured to the wheel. For the purpose of enabling said member 11 to engage with the spoke 13, if desired, the extremity of said member 11 may be suitably formed for that purpose—such, for instance, as by bifurcating the same, as at 15. This member 11 is provided with a bearing 16, which is journaled upon a stud 17, suitably carried by the casing 18, which contains the mechanism of the locking device.

Any suitable means for automatically actuating the member 11 upon its being released by a suitable key to be inserted through the slot 19 in the casing 18 of the lock may be employed, such means in the present instance being illustrated as comprising a spring 20, surrounding the shaft or stud 17, one end 21 of which spring being adapted to bear against a suitably-disposed stud 22, mounted on the interior of the casing, while the end 40 of such spring bears in the present instance against a wall 23, formed by depressing a portion of the bearing 16, as at 24.

A suitable number of tumblers 25, 26, and 27 (in the present instance shown as three) are movably supported on a post 28, each tumbler being provided in the present instance with springs 29, which bear against the inner wall 30 of the casing 18. These tumblers may be arranged in any suitable manner, and each may be provided with engaging means 31, which are adapted to engage with a catch 34, suitably disposed on the member 11 and adapted to enter into the opening 35 in the casing 18. The ends 36, 37, and 38 of the tumblers are staggered—that is to say, one projects a little farther beyond the other and into the path of a keyway 39, it being obvious that the key will be so formed as to properly engage with said extremities 36, 37, and 38, whereby the three tumblers may be so actuated that the engaging portions thereof 31 may be simultaneously moved out of the path of the catch 34, when the member 11 may automatically fly out of its engaging position, when, as is obvious, one member of the running-gear may be operated with respect to the other.

It will now be observed that I have provided a locking device adapted for securement to either the wheel or the framing of a vehicle and that such device comprehends an arm pivotally mounted thereupon, said arm being operative as an instrumentality to prevent the rotation of the wheels with respect to said framing.

It will be further observed that said arm when released from such position it may occupy to fulfil its office will automatically adjust itself to an inoperative position.

Within the comprehension of this invention it is my privilege to vary the construction, form, and arrangement of parts without departing from the spirit thereof, also to introduce such modifications as will simplify the carrying forward of the objects of this invention.

Having thus described my invention, I claim—

A vehicle-locking device comprising a casing, an arm pivoted to the casing and projecting beyond the same, a hook member fast on the arm, an aperture in the casing-wall, a spring connected with the arm and arranged to yieldably retain the arm with the hook member projecting into the casing through such aperture, a pivotal pin in the casing, a plurality of superposed tumblers pivoted on said pin and provided with hook extremities arranged to engage the hook member of said arm to retain the arm in engaging position against the force of said spring, a spring member in the casing arranged to normally retain the tumblers in engaging position, the tumblers having their other ends unevenly arranged when in the locking position, an aperture in the casing opposite the said uneven extremities of the tumblers, and a key arranged to be inserted in the latter aperture in the casing and having an uneven portion arranged to engage the said uneven portion of the tumblers upon the key being advanced endwise to thereby rock the tumblers to disengage the hook member of the swinging arm, whereby the arm will be moved by its spring to any non-engaging position.

Signed at Nos. 9 to 15 Murray street, New York city, New York, this 3d day of November, 1904.

ROBERT CONGREVE.

Witnesses:
FRED. W. BARNACLO,
JOHN O. SEIFERT.